(12) United States Patent
Bronner

(10) Patent No.: US 11,306,684 B2
(45) Date of Patent: Apr. 19, 2022

(54) GAS INJECTOR

(71) Applicant: Eugen Seitz AG, Wetzikon (CH)

(72) Inventor: Michael Bronner, Balterswil (CH)

(73) Assignee: Eugen Seitz AG, Wetzikon (CH)

( * ) Notice: Subject to any disclaimer, the term of this patent is extended or adjusted under 35 U.S.C. 154(b) by 89 days.

(21) Appl. No.: 16/640,974

(22) PCT Filed: Aug. 21, 2018

(86) PCT No.: PCT/EP2018/072493
§ 371 (c)(1),
(2) Date: Feb. 21, 2020

(87) PCT Pub. No.: WO2019/038254
PCT Pub. Date: Feb. 28, 2019

(65) Prior Publication Data
US 2020/0191096 A1    Jun. 18, 2020

(30) Foreign Application Priority Data

Aug. 22, 2017   (EP) .................................... 17187228

(51) Int. Cl.
*F02M 21/02*   (2006.01)
*F02B 19/00*   (2006.01)

(52) U.S. Cl.
CPC ......... *F02M 21/0254* (2013.01); *F02B 19/00* (2013.01)

(58) Field of Classification Search
CPC ........... F02M 21/0254; F02M 21/0215; F02M 21/0296; F02M 21/0269; F02B 19/00; Y02T 10/30

USPC ....................... 123/525, 490, 470; 239/585.4
See application file for complete search history.

(56) References Cited

U.S. PATENT DOCUMENTS

| 3,845,748 | A | * | 11/1974 | Eisenberg | .............. F02M 61/14 123/468 |
| 3,920,230 | A | * | 11/1975 | Murphy | .................... C21B 7/16 266/188 |
| 5,365,907 | A | * | 11/1994 | Dietrich | .................. F02F 1/242 123/468 |
| 5,617,828 | A | * | 4/1997 | Kuegel | ................ F02M 55/005 123/468 |
| 5,775,303 | A | * | 7/1998 | Sweetland | ............. F02M 61/14 123/470 |

(Continued)

FOREIGN PATENT DOCUMENTS

| CN | 1723343 A | 1/2006 |
| CN | 101273193 A | 9/2008 |

(Continued)

*Primary Examiner* — Hai H Huynh
(74) *Attorney, Agent, or Firm* — The Webb Law Firm

(57) ABSTRACT

A gas injector has an injector lance, a drive unit, a push rod and a valve. The injector lance has a free end for injecting gas into an external unit. The drive unit generates a linear movement of the push rod, as a result of which the push rod actuates the valve and exposes a valve through-passage opening, in order for the gas to be injected. The valve through-passage opening is arranged in the region of the free end of the injector lance ). The gas injector can be designed to be relatively small and narrow. It minimizes switching delays, avoids dead spaces and prevents contamination of the valve.

15 Claims, 13 Drawing Sheets

(56) References Cited

U.S. PATENT DOCUMENTS

| | | | |
|---|---|---|---|
| 6,199,539 B1* | 3/2001 | Pearlman | F02M 55/005 |
| | | | 123/470 |
| 6,279,540 B1* | 8/2001 | Greaney | F02M 55/002 |
| | | | 123/468 |
| 7,124,998 B2 | 10/2006 | Steinruck et al. | |
| 8,623,144 B2* | 1/2014 | Liu | C01B 32/162 |
| | | | 118/729 |
| 9,239,035 B2* | 1/2016 | Guido | F02M 55/005 |
| 9,453,456 B2 | 9/2016 | Hanson et al. | |
| 10,125,731 B2* | 11/2018 | Autret | F02M 55/02 |
| 2005/0257769 A1 | 11/2005 | Li et al. | |
| 2007/0039591 A1 | 2/2007 | Wang et al. | |
| 2011/0214639 A1 | 9/2011 | Ishida et al. | |
| 2017/0101966 A1 | 4/2017 | Filippi et al. | |

FOREIGN PATENT DOCUMENTS

| | | |
|---|---|---|
| EP | 3153693 A1 | 4/2017 |
| JP | H1030517 A | 2/1998 |
| JP | 2000257527 A | 9/2000 |
| JP | 200182254 A | 3/2001 |
| KR | 1020170056749 A | 5/2017 |
| WO | 2016008055 A1 | 1/2016 |

* cited by examiner

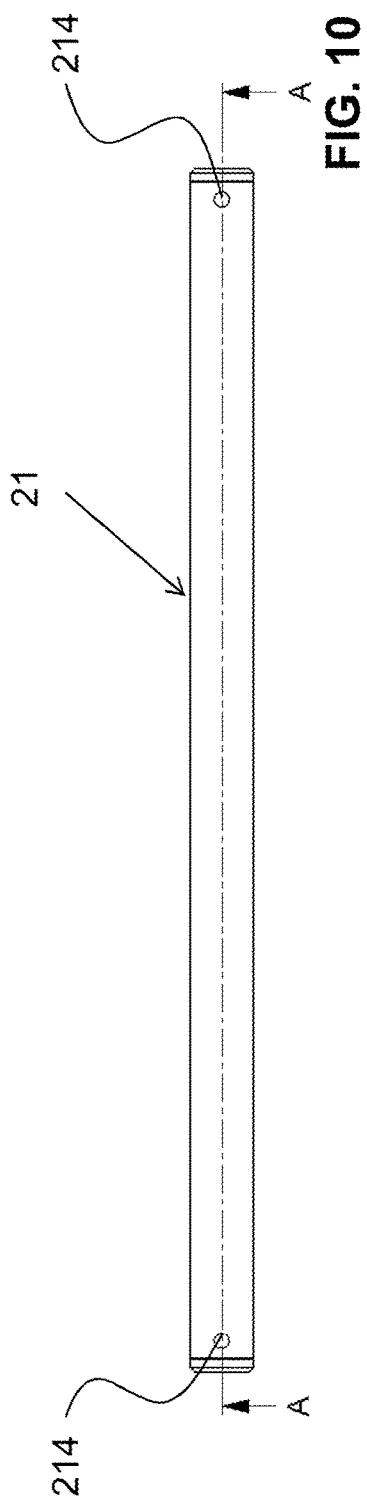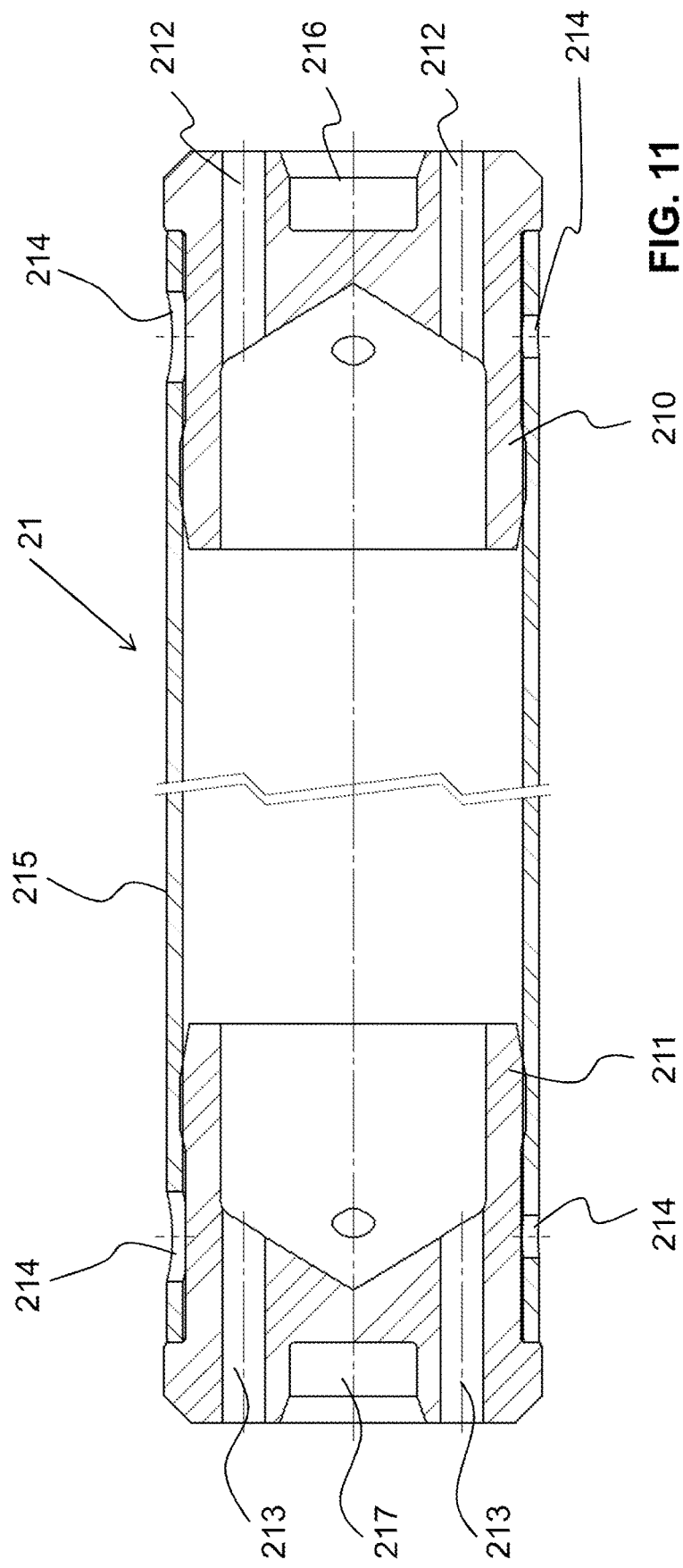

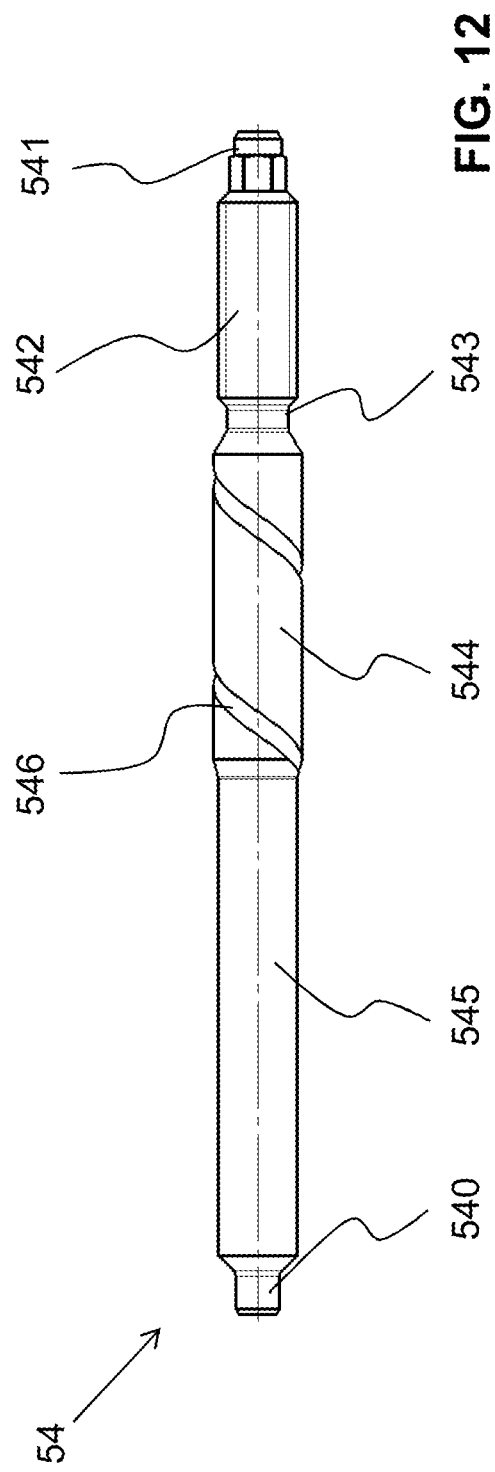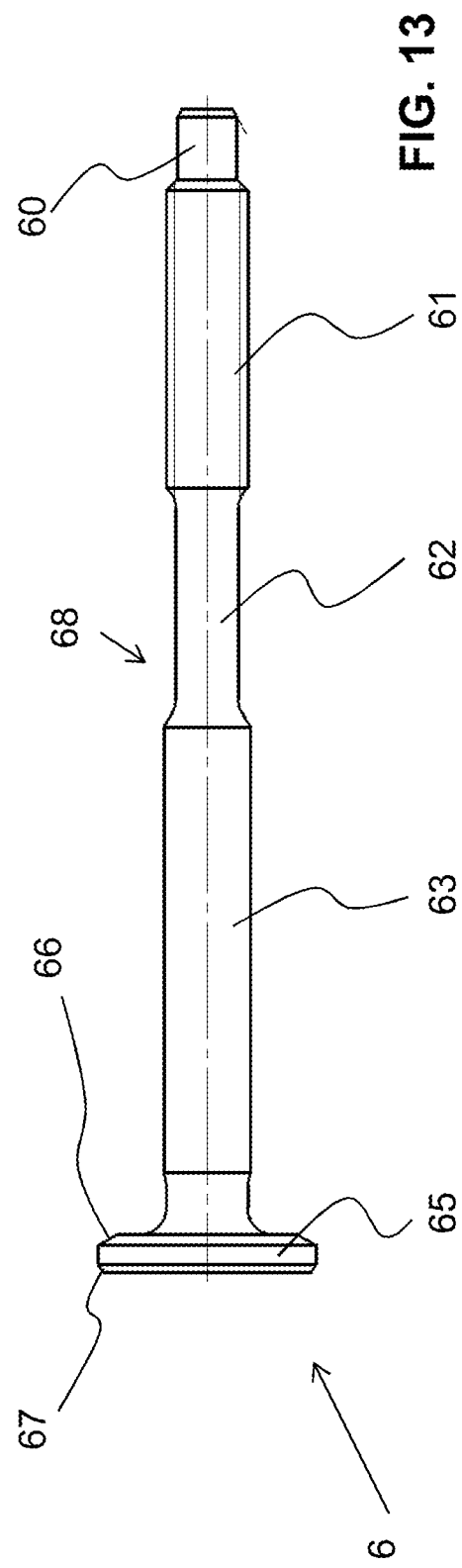

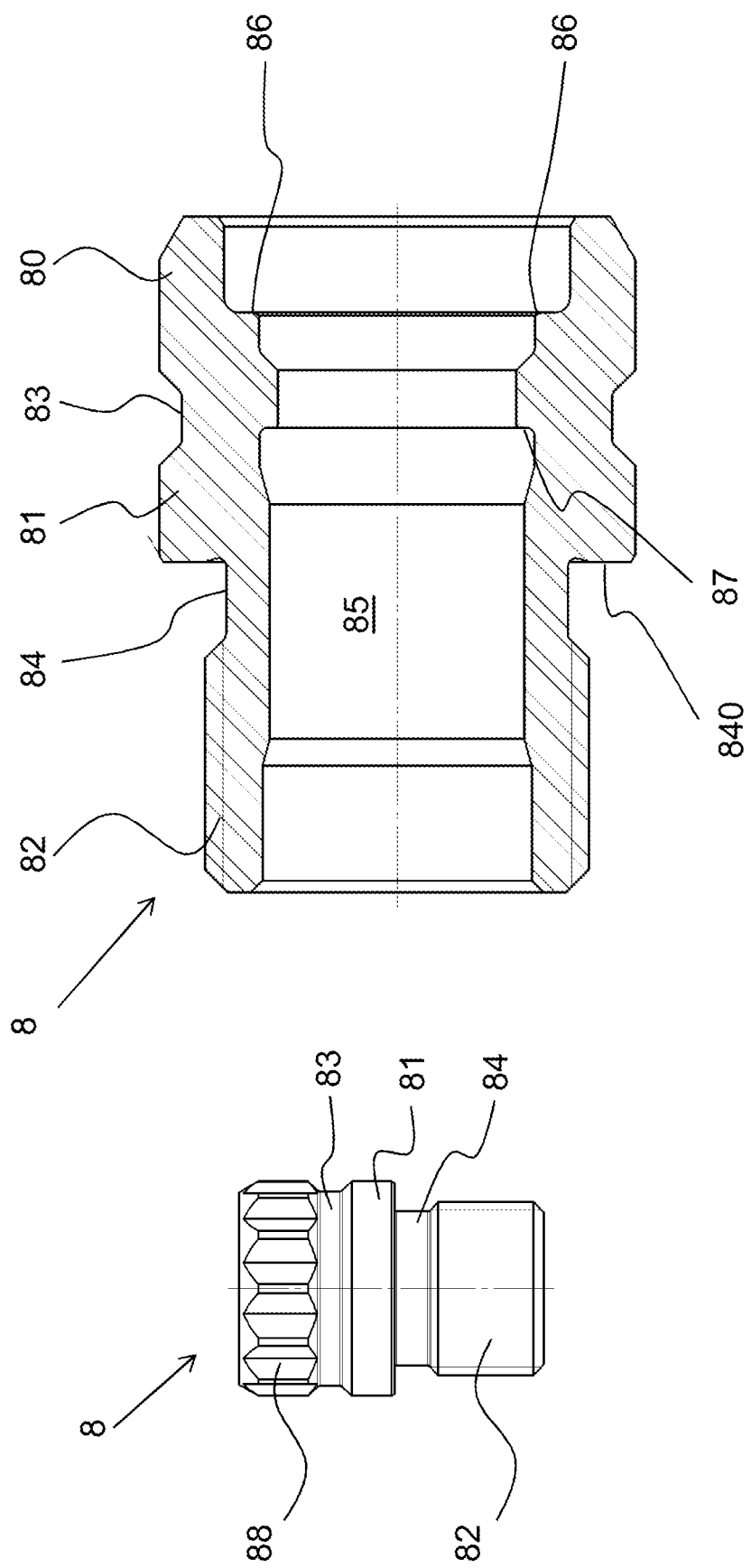

GAS INJECTOR

CROSS-REFERENCE TO RELATED APPLICATIONS

This application is the United States national phase of International Application No. PCT/EP2018/072493 filed Aug. 21, 2018, and claims priority to European Patent Application No. 17 187 228.6 filed Aug. 22, 2017, the disclosures of which are hereby incorporated by reference in their entirety.

BACKGROUND OF THE INVENTION

Field of the Invention

The present invention relates to a gas injector, in particular for an internal combustion engine.

Description of Related Art

The gas injector, also known as an injection valve, meters gas, for example, into a prechamber or a into combustion chamber of an internal combustion engine, in particular a gas engine. In machines, a non-return valve can also be connected downstream in order to enable gas to be injected in a metered manner. The gas injector is conventionally electromagnetically operated, preferably by means of a solenoid.

Two valves are required for metering purposes—a switching valve and a non-return valve—or a nozzle, which conducts the gas to the combustion point, is connected downstream of the switching valve. Intervening spaces are thus created, which result in switching delays owing to the compressibility of the gas. Moreover, these gas injectors become contaminated relatively quickly. However, deposits in the valve region can interfere with reliable switching. In particular, sooting in the region of the valve seat can cause functional problems in the internal combustion engines. Furthermore, gas injectors of this type must also ensure reliable sealing and easy switchability under a high combustion pressure.

U.S. Pat. No. 7,124,998 B2 discloses an electromagnetically actuable gas valve for gas engines. It has a valve seat having a throughflow opening and a sealing plate having discharge openings. The sealing plate is loaded against the valve seat by means of a closing spring, wherein it can be lifted off this valve seat by means of an electromagnet. The sealing plate is arranged on the discharge side of the valve seat and connected to an armature plate of the electromagnet via a tappet projecting through the valve seat. A Venturi nozzle or de Laval nozzle is arranged downstream of the sealing plate. This arrangement is disadvantageous in that the Venturi nozzle or the de Laval nozzle creates a dead space in which soot deposits and unburned hydrocarbons are produced.

U.S. Pat. No. 9,453,456 has the same disadvantages. A relatively long fuel pipe follows the conical valve seat, which fuel pipe forms a dead space and enables soot to settle therein.

US 2011/0214639 discloses a switching valve and a metering valve having a corresponding intervening space, which results in switching delays.

SUMMARY OF THE INVENTION

It is therefore an object of the invention to provide a gas injector which, as far as is possible, has little delay and requires no maintenance.

The gas injector according to the invention has an injector lance, a drive unit, a tappet rod and a valve. The injector lance has a free end for injecting gas into an external unit and the drive unit generates a linear movement of the tappet rod, whereby the tappet rod actuates the valve and releases a valve passage opening in order to inject the gas. According to the invention, the valve passage opening is arranged in the region of the free end of the injector lance.

The gas injector according to the invention is preferably electrically actuable. The drive unit can typically contain an electromagnet. Alternatively, piezoelectric, hydraulic, pneumatic or other known drives can be used.

The drive unit is preferably arranged in a base unit and the injector lance is securely connected to this base unit. The free end is logically located at the end remote from the drive or at the end remote from the base unit.

This gas injector can be used as in injection valve. It meters gas into an external unit, in particular into a prechamber or directly into a combustion chamber of an internal combustion engine, in particular a gas engine. It can also be used to blow gas directly upstream of, or into, an inlet valve of a machine. It is particularly suitable for prechamber ignition, pilot injection systems and for stratified charges.

Since the valve opening is arranged at a free end of the injector lance, i.e. in an outermost region, dead spaces or intervening spaces are not present. Switching delays caused by compressible gasses are thus prevented. Since this free end can project into the prechamber or combustion chamber, or is at least in direct contact therewith, the combustion reaction or flame front can progress directly to the valve, in particular to the valve seat and the valve disk, and can burn all of the gas. Unburned hydrocarbons are thus minimized.

Owing to the proximity to the combustion chamber, at least the valve disk and the valve seat reach the self-cleaning temperature. All deposits on the valve disk or in other parts of the valve which are in the vicinity of the combustion chamber are burned away and sooting is minimized. Cleaning of the injector during maintenance procedures of the gas engine is unnecessary.

The said base unit serves as a connection housing. It contains the drive unit, in particular a solenoid unit having the electromagnets and the coolant connections thereof, and at least one connection for the gas supply line. This arrangement enables a compact construction.

This valve is preferably the sole valve of the gas injector. This in turn prevents intervening spaces, unburned hydrocarbons and sooting.

It is furthermore advantageous that the injector lance and the tappet rod can have any length. The gas injector according to the invention can thus be adapted to any desired length. The injector lance preferably has one length and at least one diameter, wherein the length is four times larger than the diameter, in particular than the largest of these diameters. This construction is extremely slim and the gas injector according to the invention can also be installed in engines in which it would not be possible to use known injectors for reasons of space.

In a preferred embodiment, the drive unit comprises a solenoid unit. The tappet rod is preferably securely connected to an armature plate of the solenoid unit, wherein the armature plate is movable by actuating an electromagnet of the solenoid unit. As a result of the armature plate being energized upon actuation of the electromagnet, an axial force is applied for opening the valve. All moving parts preferably operate under thrust, without play, when the valve is opened.

In a simple embodiment, the tappet rod passes through the electromagnet. However, an armature spindle is preferably present, which connects the tappet rod to the armature plate, wherein the armature spindle is guided in the center of the electromagnet. The base unit with the solenoid unit can thus be formed in a consistently uniform manner and only the lengths of the injector lance and the tappet rod have to be adapted to the engine conditions.

The armature spindle preferably has a spiral groove over at least a region of its length. This ensures pressure equalization above and below the solenoid. In addition, the guide is less susceptible to contamination. The ease of motion enables reliability over the entire useful life of the injector.

The armature spindle is preferably designed to be solid, i.e. it has a closed form and preferably has no cavities, or no significant cavities.

The valve preferably has a valve rod and a valve disk arranged thereon, wherein the valve rod is connected to the tappet rod in order to be linearly displaceable together therewith in the axial direction. This connection is preferably loose. This also increases the flexibility of the assembly. The valve unit can be formed in a consistently uniform manner and only the lengths of the tappet rod and the shaft have to be adapted according to the engine geometry.

The valve rod and the valve disk are preferably manufactured as one solid piece. Depending on the embodiment, the valve rod has a cavity, which is filled with a different material. This variant is also covered by the term "solid".

In preferred embodiments, the valve disk has a sealing face directed contrary to a discharge direction of the gas, which lies in a sealing manner against a valve seat in order to thereby close the valve passage opening and therefore the valve. The valve cone is preferably displaceable in the discharge direction in order to open the valve. Under increasing combustion pressure, the pressure in the valve seat therefore increases and the valve cannot open automatically.

In preferred embodiments, a closing spring is present on the valve rod of the valve cone, which closing spring holds the valve in the closed position or brings it into the closed position. The closing procedure is preferably realized not by means of the electromagnet but by means of the spring force. The valve seat is preferably subjected merely to the impact energy of the valve cone as the valve closes.

In a preferred embodiment, the tappet rod is uncoupled from the valve cone as the valve closes. Therefore, during the closing procedure, the valve seat is preferably subjected merely to the impact energy of the valve cone. This measure prevents the switching valve from bouncing, in particular in the case of injectors with long tappet rods. The useful life of the injector is additionally increased as a result of the lower impact energy.

The tappet rod can likewise be designed to be solid. However, it is preferably designed to be hollow. This results in good rigidity whilst, at the same time, the mass to be moved is as low as possible.

The injector lance preferably has a shaft, and the tappet rod is arranged within the shaft and is linearly displaceable relative thereto.

In simple embodiments, the shaft itself forms a valve seat. However, the free end of the injector lance is preferably formed by a valve body which is arranged on the shaft, wherein the valve body has the valve passage opening. The valve body is preferably releasably connected to the shaft. This facilitates manufacture, assembly and maintenance.

All moving parts of the gas injector, in particular the tappet rod, the armature spindle and the valve cone, are preferably guided radially. They are preferably different components, which are securely connected to one another, or can be brought into engagement with one another, at the end faces.

A second spring, in particular a pressure spring, is preferably present in addition to the closing spring. This second spring ensures play-free axial contact of all moving parts of the gas injector, in particular the drive unit, in a starting position. In particular, after each opening of the valve, it returns the tappet rod and, where present, also the armature spindle and the armature plate to their original starting position.

If the tappet rod is able to separate from the valve cone as the valve closes and/or if, as mentioned above, a second spring is present, which damps the movement of the armature spindle and the armature plate as the valve closes, the switching valve can be prevented from bouncing, even in the case of long shafts, and the service life of the gas injector can be increased.

The spring force of the closing spring, the further spring, which is present when necessary, and the valve stroke can preferably be set individually during assembly. Each individual gas injector can thus be adapted to specific customer requirements. For example, switching times, metering quantities, response behavior and other aspects can be set freely. All injectors of a production batch can thus be adjusted for precise equalization.

BRIEF DESCRIPTION OF THE DRAWINGS

A preferred embodiment of the invention is described below with reference to the drawings, which serve merely for explanation and should not be interpreted as restrictive. The drawings show:

FIG. 10 a side view of a tappet rod of the gas injector according to FIG. 4;

FIG. 11 a longitudinal section through the tappet rod along A-A of FIG. 10;

FIG. 12 a side view of an armature spindle of the gas injector according to FIG. 4;

FIG. 13 a side view of a valve cone of the gas injector according to FIG. 4;

FIG. 18 a side view of a valve body of the gas injector according to FIG. 4;

FIG. 19 a longitudinal section through the valve body according to FIG. 18;

DESCRIPTION OF PREFERRED EMBODIMENTS

Figure 2:
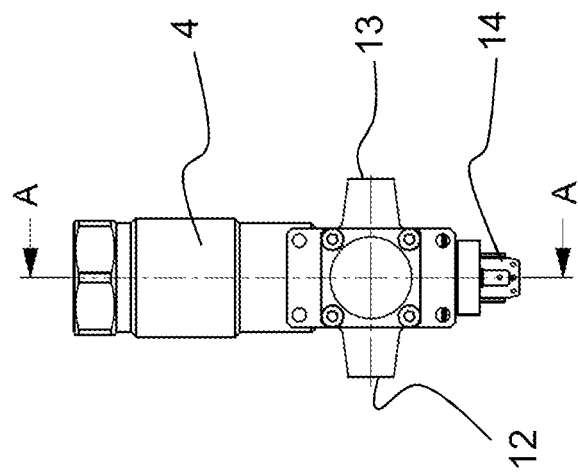
FIG. 2 a side view of the device according to FIG. 1.
Figure 1:
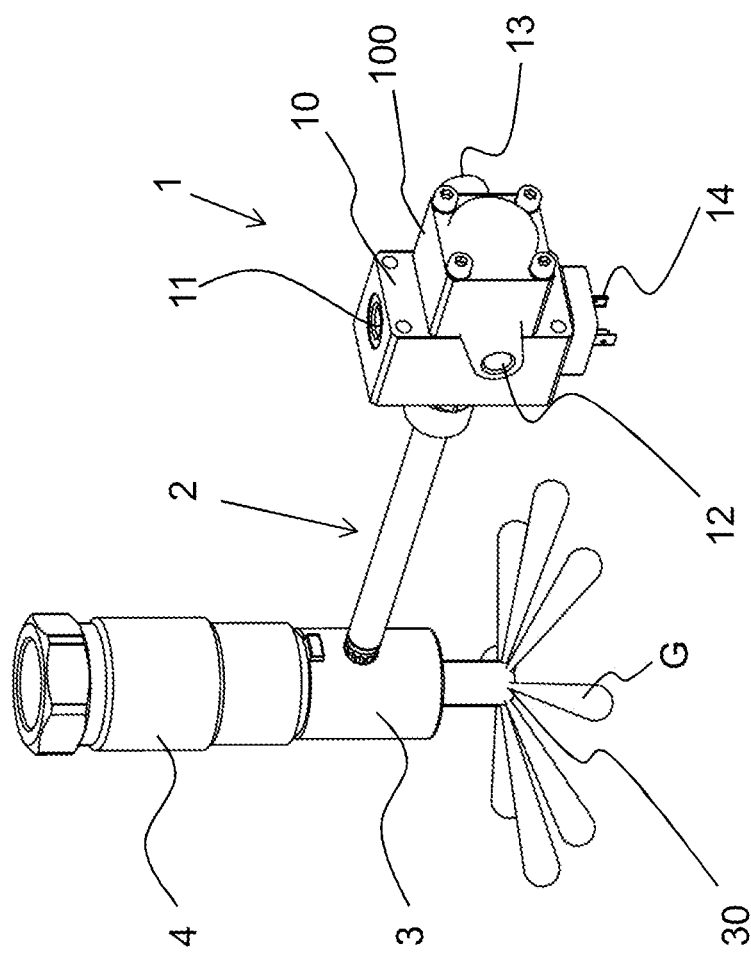
FIG. 1 a perspective illustration of a device having a gas injector according to the invention, connected to a prechamber of an internal combustion engine.
Figure 3:
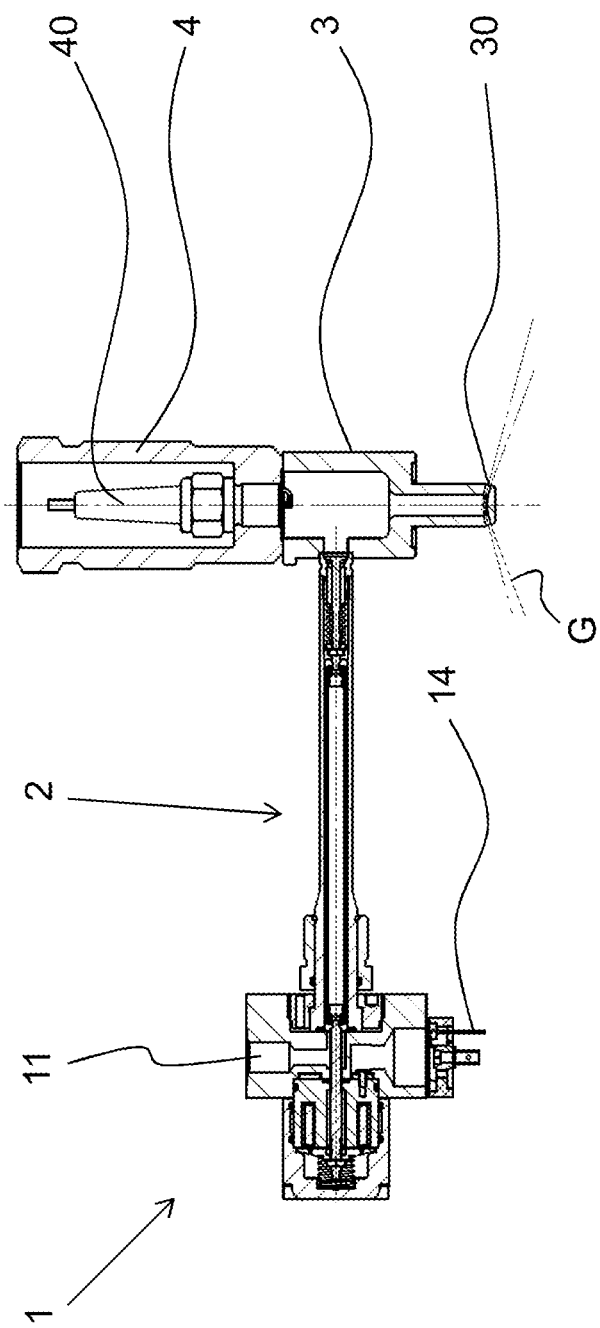
FIG. 3 a longitudinal section through the device along A-A according to FIG. 2.

A gas injector according to the invention is illustrated in an exemplary application in FIGS. 1 to 3.

The gas injector has a base unit 1 and an injector lance 2. The base unit 1 has a base housing 10, which is tightly closed by a cover 100. A gas connection 11 is present on one side of the base housing 10 and an electrical plug 14 is arranged on an opposite side. A coolant inlet 12 and a coolant outlet 13 are located in the cover 100.

Instead of the plug 14, an electrical connection can also be securely connected to the housing. This is then particularly advantageous if the gas injector is to be used at high environmental temperatures.

As an alternative to the shown gas connection 11 of the base unit, the injector lance 2, more precisely the shaft 20 described below, can be provided with a bore or with a plurality of bores for the introduction of gas. In this case, a hollow pressure screw is preferably used in order to ensure a combustion-gas seal between the injector lance 2 and the cylinder head of an internal combustion engine.

The injector lance 2 is designed to be long and slim and is in secure and gas-tight contact with the base unit 1.

As illustrated here, a free end of the injector lance 2 which is remote from the base unit 1 can be connected to a prechamber 3 of an internal combustion engine, in particular a gas engine. The prechamber 3 has nozzle bores 30 through which the ignited gas/air mixture is injected into the combustion chamber of the internal combustion engine and therefore the main charge in the cylinder is ignited. The ignition delay can therefore be reduced considerably, in particular in the case of large gas engines. The gas injected via the gas connection 11 into the gas injector and, from there, into the prechamber 3, ensures reliable ignition even in the case of a lean mixture in the cylinder. The combustion chamber is not illustrated here. The burning gas/air mixture exiting from the nozzle bores 30 can be seen in FIGS. 1 and 3 and is denoted by the reference sign G.

In the example illustrated here, a housing 4 with a spark plug 40 is located in the upper region of the prechamber 3.

The gas injector according to the invention can also be used in other arrangements. For example, it can also be introduced directly into the combustion chamber.

Figure 4:
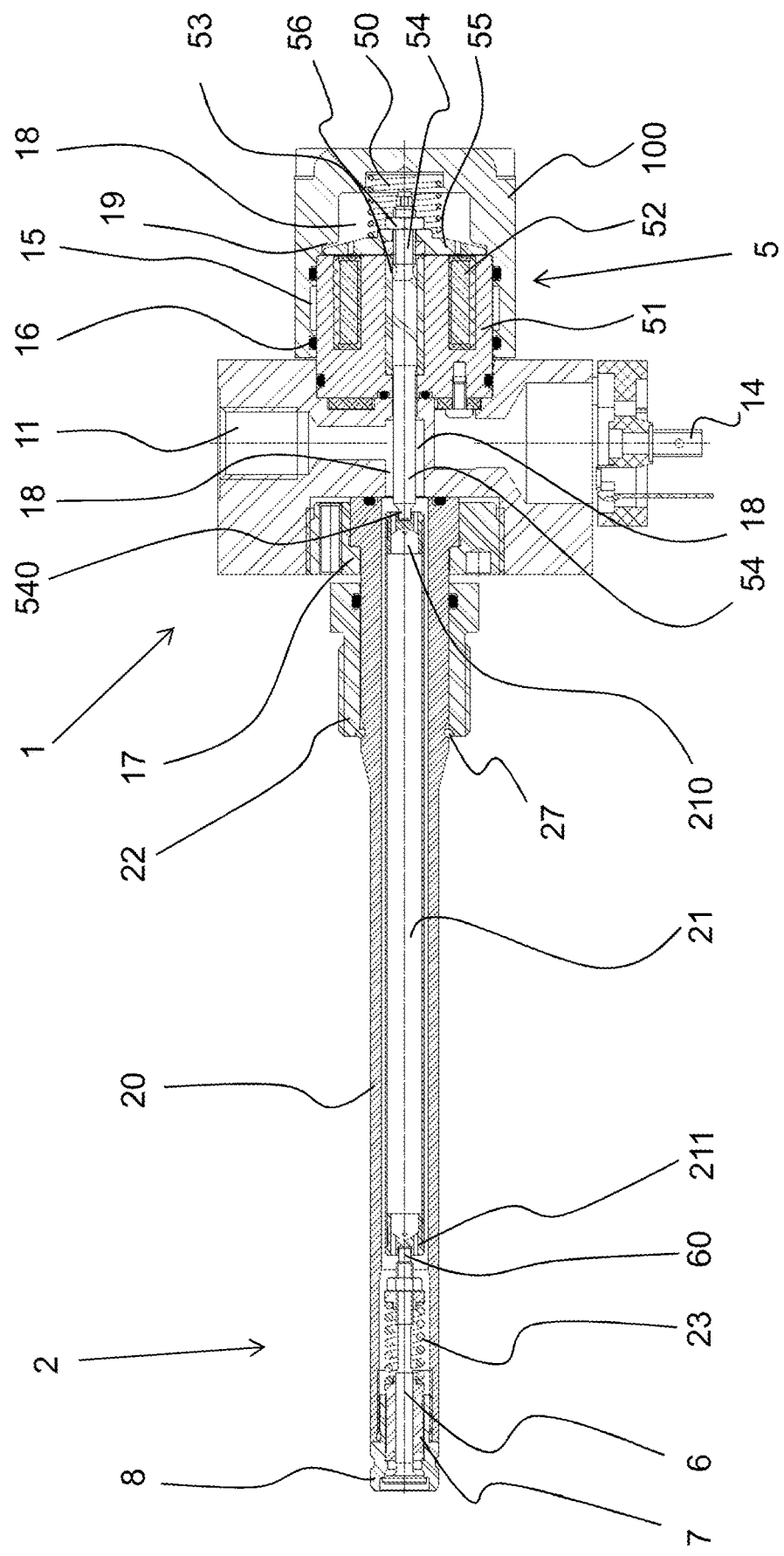
FIG. 4 a first longitudinal section through the inventive gas injector according to FIG. 1.
Figure 5:
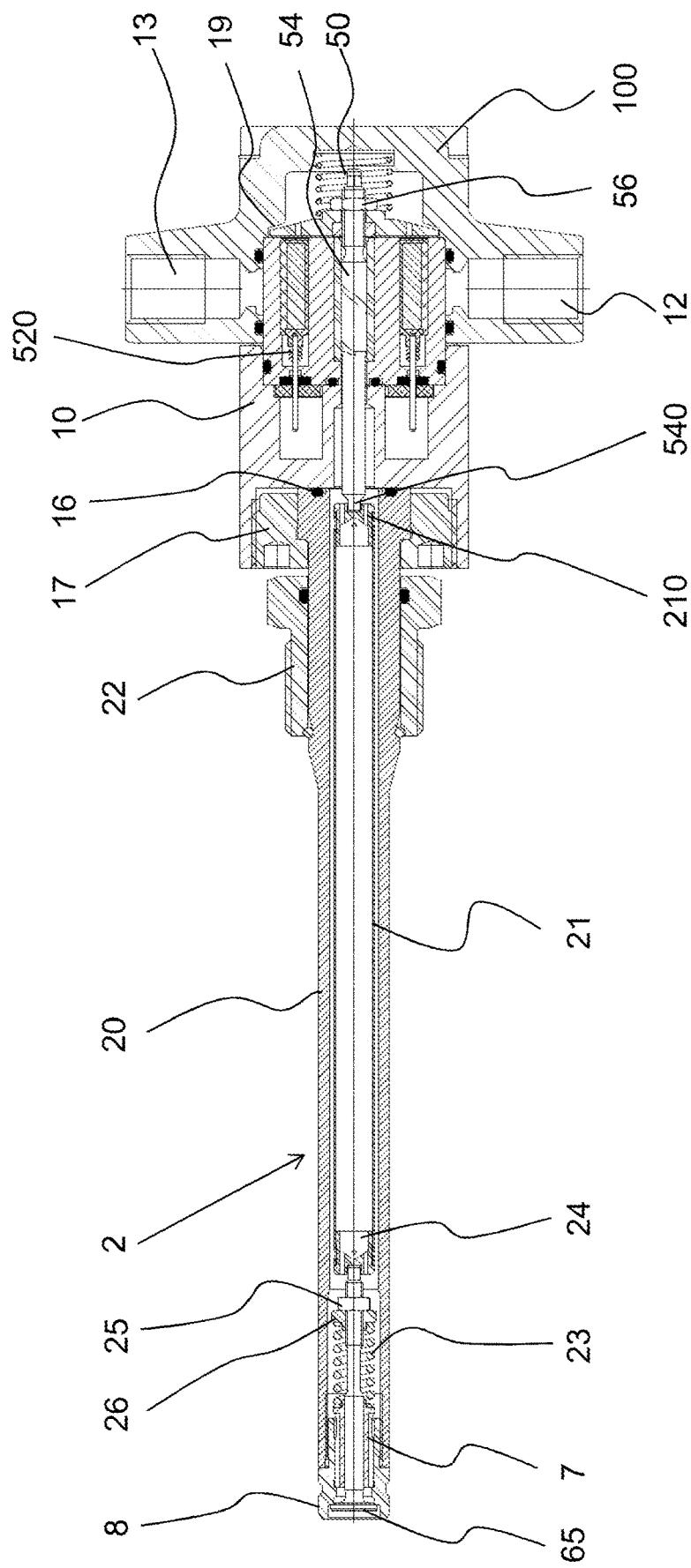
FIG. 5 a second longitudinal section through the inventive gas injector according to FIG. 1.
Figure 6:
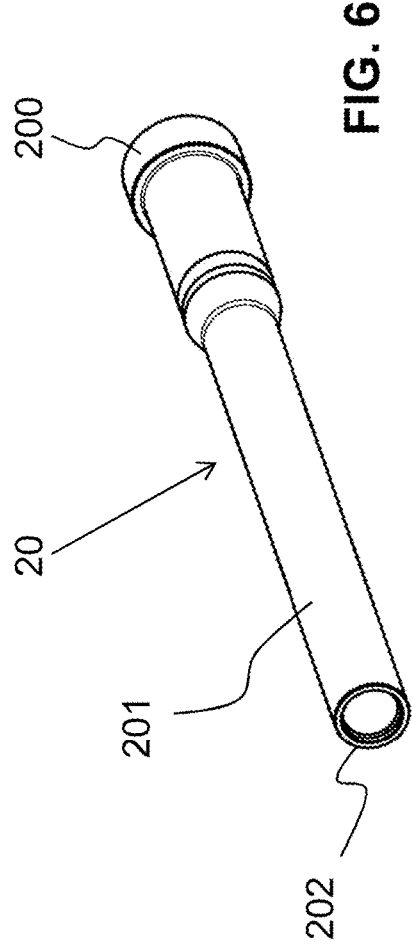
FIG. 6 a perspective illustration through an injector shaft of the gas injector according to FIG. 4.

FIGS. 4 and 5 show two longitudinal sections through the gas injector according to the invention. The longitudinal sections are at right angles to one another.

A drive unit is arranged in the base unit 1. The drive unit in this example comprises an electromagnet, in particular a solenoid unit 5. However, in the same manner, alternative drives, as mentioned at the outset, can be combined analogously with the other mentioned elements of this exemplary embodiment and implemented according to the invention.

The solenoid unit 5 has a coil 52 and a magnetic core 51. The crimped connection pins 520 of the coil 52, which form an external connection via the plug 14, can be seen in FIG. 5.

The coolant inlet 12 and the coolant outlet 13 are also illustrated in FIG. 5. They lead into an annular coolant chamber 15, which surrounds the magnetic core 51. The coolant flows around the magnetic core 51 and keeps the electromagnet at a desired operating temperature. It is a liquid or a gas. Ideally, a fluid is used which is already present in the engine, e.g. coolant, engine oil or another heat-carrying fluid. Depending on the temperature of the environment in which the gas injector is to be used, the heat emission to the environment is sufficient without an additional connection to a cooling medium.

A guide and buffer sleeve 53, through which an armature spindle 54 passes, is arranged in a central through-opening of the solenoid unit 5. The armature spindle 54 engages with its external thread in an internal thread of an armature plate 55 and is moreover held in a secure position on the armature plate 55 by means of a lock nut 56. When the electromagnet is energized, the armature plate 55 is preferably kept at a distance via the guide and buffer sleeve 53 so that the armature plate can never lie on the magnetic core 51. Therefore, magnetic bonding is prevented when the electrical energy is shut off and the closing of the valve is thus accelerated.

The cover 100 has an upper stop 19 above the armature plate 55.

A pressure spring 50 acts on the armature plate 55 and presses this in the direction of the magnetic core 51. In the rest position, however, the armature plate 55 is located at a distance from the magnetic core 51. The pressure spring 50 is held in the cover 100. It has a spring force which is multiple times lower than that of a closing spring 23 described below. After the overshooting closing procedure, the pressure spring 50 returns all moving parts of the drive unit to the starting position, without play, and therefore prepares the injector for the next switching procedure.

A plurality of sealing O rings, which are illustrated as solid black surfaces, are arranged in the base unit 1. By way of example, two of these O rings are denoted by the reference sign 16.

The gas connection 11 can be seen in FIG. 4. It terminates in a cylindrical gas chamber 18, through which the armature spindle 54 passes and which is located on the side of the magnetic core 51 which is opposite the armature plate 55. The gas chamber 18 is formed by a first blind bore in the base housing 10. This first bore 18 guides the gas in the direction of the switching valve.

Figure 7:
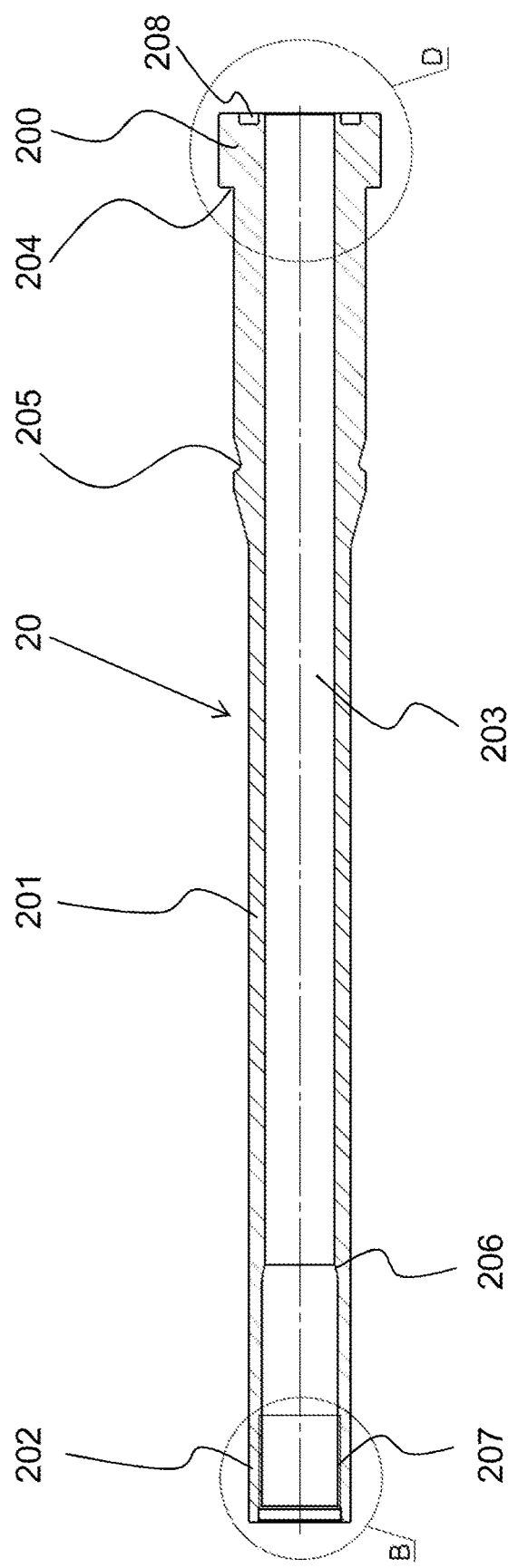
FIG. 7 a longitudinal section through the injector shaft according to FIG. 6.

The injector lance 2 has a long, slim tubular injector shaft 20, whereof the central axis is flush with the central axis of the armature spindle 54 and the cylindrical gas chamber 18 and forms an extension thereof. The injector shaft 20 has a through-opening 203 (see FIG. 7), whereof the diameter is preferably equal to, and more preferably larger than, the diameter of the gas chamber 18.

The injector lance 2, more precisely the injector shaft 20, lies against the inner base surface of the second blind bore and is sealed to the outside by means of an O ring 16. The injector shaft 20 is held fixed in the base housing 10 by means of a securing nut 17, which is screwed into the internal thread of the second blind bore.

A tappet rod 21 is arranged in the injector shaft 20 to be displaceable in the longitudinal direction. The tappet rod 21 is preferably a thin-walled tube with two mutually opposing open ends, which are partially closed by a first tappet rod head 210 and a second tappet rod head 211. The two tappet rod heads 210, 211 have pressure compensating bores 212, 213, which are described in detail in the text below.

The first tappet rod head 210 is located adjacent to the armature spindle 54 and is non-releasably connected to the thin-walled tappet tube 215. The armature spindle 54 has an armature spindle head 540, which lies in the blind bore base of the first tappet rod head 210. The opposite end of the armature spindle 54 is formed by an armature spindle base 541 which projects beyond the lock nut 56.

The first and the second tappet rod head 210, 211 are preferably designed to be identical. However, they can also be formed differently. Both tappet rod heads 210, 211 are non-releasably connected to the thin-walled tappet tube 215.

The second tappet rod head 211, and therefore the second end of the tappet rod 21, lies loosely on the valve cone 6. In this example, the second tappet rod head 211 also has a blind bore, which guides the tappet rod 21 radially on the valve cone 6, more precisely on a valve base 60. In another embodiment, the connection between the valve base 60 and the tappet rod head 211 is secured.

However, the valve base 60 and the tappet rod head 211 can preferably be uncoupled in a movement contrary to the discharge direction.

The valve cone 6 passes through the front free end of the injector shaft 20 and terminates in a valve body 8. The valve body 8 is screwed to the free end of the injector shaft 20 or secured in another manner and preferably tightly connected thereto. The valve body 8 and the injector shaft 20 preferably form the outer sheath of the injector lance 2.

The valve body 8 forms a valve seat, which will be described in more detail below. The valve seat 6 has a corresponding valve disk 65, which will likewise be described in more detail below. The valve cone 6 is displaceably held and radially guided within a sleeve-shaped valve guide 7, wherein its valve disk 65 is pressed against the valve seat by means of a closing spring 23 so that the valve is closed in the rest position.

The spring seat 26, the closing spring 23 and a lock nut 25, by means of which the valve cone 6 is securely connected to the closing spring 23, are illustrated in FIGS. 4 and 5.

A hollow pressure screw 22, which is arranged adjacent to, but at a distance from, the securing nut 17, is furthermore mounted on the injector lance 2. This hollow pressure screw 22 preferably serves for assembling the gas injector on an external unit, in particular on an engine, for example on a gas engine. However, alternatively, the gas injector can also be secured on or in the engine in another manner. Depending on the embodiment, the base unit can be installed on the engine using screws, for example.

The injector shaft 20 can be clearly seen in FIGS. 6 to 9. It has a hollow-cylindrical shaft head 200 with an annular groove 208 arranged at the end face for receiving a sealing O-ring. The shaft head 200 meres into the injector tube 201 at an outer step 204. The injector tube firstly has a region with a first outer diameter and then a region with a second outer diameter, wherein the first diameter is larger than the second diameter. A transition region with an annular circumferential outer groove 205 and a chamfer is located between these two regions. As can be clearly seen by looking at FIGS. 4 and 7 together, the outer step 204 is positioned against a corresponding step of the securing nut 17. The outer groove 205 serves for receiving a snap ring 27, which fixes the hollow pressure screw 22 in place.

The through-opening 203 of the injector shaft 20 preferably has a constant internal diameter with the exception of a free end region, which is remote from the shaft head 200. The closing spring 23 and the valve cone 6 are arranged in the end region, as can be clearly seen by looking at FIGS. 4 and 7 together. An inner step 206 is present in this end region. The end region preferably has a slightly larger diameter than the rest of the injector shaft. An internal thread 207 is present in the free open end 202 of the injector shaft 20 and, at the front end, a further inner step, wherein the front end is designed without a thread but with a widened diameter.

Figure 9:
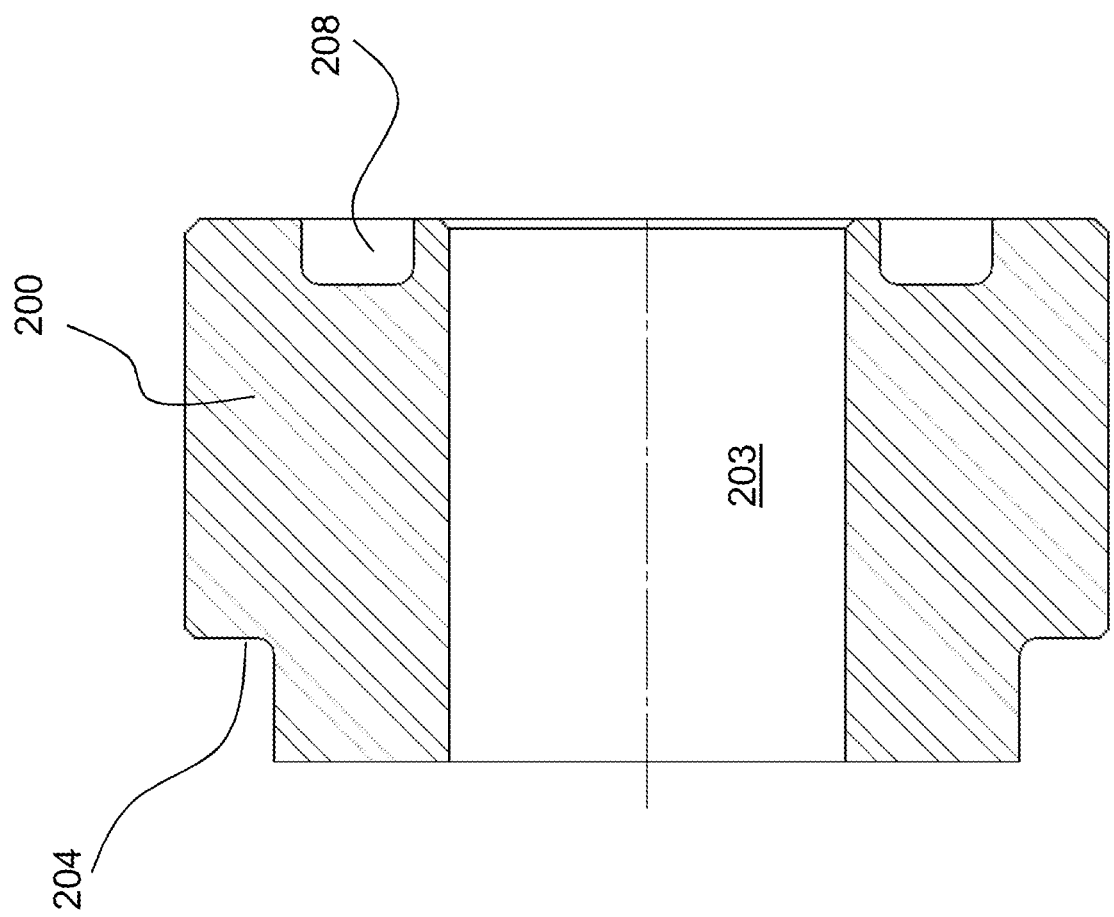
FIG. 9 an enlarged illustration of a second end region of the injector shaft according to D of FIG. 6.
Figure 8:
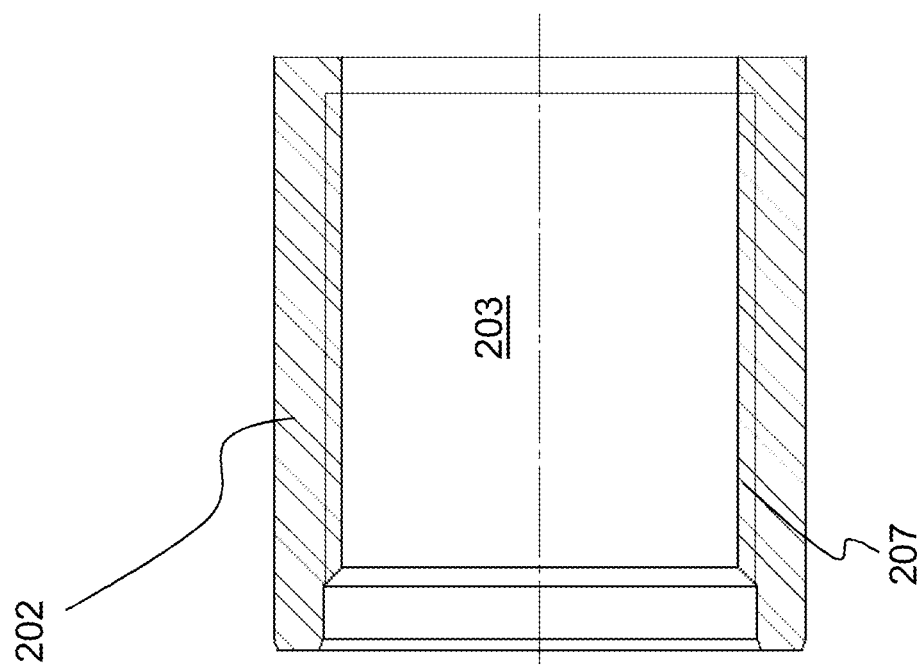
FIG. 8 an enlarged illustration of a first end region of the injector shaft according to B of FIG. 6.

This free open end 202 is illustrated on an enlarged scale in FIG. 8. FIG. 9 shows the shaft head 200 in an enlarged illustration.

FIGS. 10 and 11 show the tappet rod 21. It is formed by a thin-walled tube 215, which is provided, at both ends, with a tappet rod head 210, 211 partially closing the respective end. These heads 210, 211 are inserts which are pressed onto the end faces of the tube 215 and project into the tube 215. The first and second tappet rod head 210, 211 are preferably designed to be identical. However, they can also be formed differently.

A first tappet rod head 210 is arranged at the end of the tappet rod 21 which is near to the solenoid. It has a cylindrical base body with a widening flange which lies on the tube 215. The end face of the flange is provided with a blind bore, which serves as a first engagement opening 216. The armature spindle head 540 of the armature spindle 54 engages in this first engagement opening 216, as can be clearly seen by looking at FIGS. 11 and 4 together, and guides the tappet rod 21 radially. The connection between the tappet rod 21 and the armature spindle 54 is therefore loose and can be uncoupled. However, the connection can alternatively be designed in a secured manner.

The tappet rod heads 210, 211 are provided with pressure equalizing bores 212, 213, which extend in the longitudinal direction of the tappet rod 21 and form a connection between the gas chamber 18 and the hollow interior of the tappet rod 21. The pressure equalizing bores 212, 213 ensure that the pressure prevailing in the tappet rod tube 215 is the same as that in the injector shaft 20. In addition, as a result of the pressure equalizing bores 212, 213, the through-flow of gas is facilitated and the flow resistance is therefore reduced.

A second tappet rod head 211 is located at the opposite end of the tappet rod 21. It has the same structure as the first tappet rod head 210, with a second engagement opening 217 and with second pressure-equalizing channels 213.

The tube 215 likewise has different-sized solder bores 214 in the region of the tappet rod heads 210, 211. To non-releasably connect the tappet rod heads to the tappet rod tube 215, these are soldered to one another. During production, solder is supplied in the soldering procedure via the solder bores 214, which have large openings. The air is forced out of the intervening space through the solder bores having smaller openings. Alternatively, the connection between the tube 215 and the heads 210, 211 can also be realized by press fit, a welded connection or the like.

The armature spindle 54 is illustrated in FIG. 12. It is preferably designed to be solid, preferably without an inner cavity. It has a plurality of cylindrical portions. A first end is formed by the armature spindle base 541, which widens to a cylindrical first portion 542 with an external thread. A subsequent release groove 543 in the form of a taper leads into a second portion 544, which preferably has a larger outer diameter than the first portion 542. The second portion 544 has a spiral groove 546 extending approximately over its entire length. A step leads to a third portion 545, which preferably in turn has a smaller outer diameter and preferably possesses a smooth surface. The third portion 545 tapers into the armature spindle head 540.

As can be clearly seen by looking at FIGS. 12 and 4 together, the armature spindle base 541 projects beyond the lock nut 56. The armature spindle is provided with a spanner flat, e.g. a hexagon head, in order to enable the position of the armature plate to be adjusted precisely. The external thread of the first portion 542 engages in the armature plate 54 and, upon actuation of the solenoid, moves together with this and the lock nut 56.

The second portion 544 slides within the guide and buffer sleeve 53, wherein the spiral groove 546 ensures pressure equalization on both solenoid sides. Moreover, the guide, with the aid of the spiral groove 546, is less sensitive to contamination. The spindle guide 54 is moreover preferably plasma-coated in order to be able to move in the guide buffer sleeve on a continued basis without lubrication. The fit-related play of the sliding assembly can therefore be selected to be very slight without resulting in jamming. The spiral groove 546 therefore also improves the guide properties of the fit.

The third portion 545 reaches from the solenoid unit to the gas chamber 18 and connects the armature spindle 54 to the tappet rod 21 owing to the armature spindle head 540.

FIG. 13 shows the valve cone 6. It has a valve rod 68, designed to be solid, with a plurality of cylindrical portions and the valve disk 65 formed at one end. An end facing the tappet rod 21 forms the valve base 60. A subsequent first cylindrical portion 61 has a larger outer diameter than the valve base 60. It furthermore possesses an external thread.

A subsequent cylindrical second portion 62 forms a taper, wherein a cylindrical third portion 63 in turn has a larger diameter. The curved surface of the second and the third portion 62, 63 is preferably designed to be smooth. The third portion 63 widens and merges into the said valve disk 65, which is preferably substantially formed as a flat, circular plate having a preferably planar end face.

The valve disk 65 has a circumferential chamfer facing the third portion, i.e. contrary to the flow direction of the gas injected via the injector, which chamfer forms the sealing face 66 of the valve. The sealing face 66 therefore forms a truncated cone with an opening angle of preferably approximately 120°. The opposite side of the valve disk 65 is likewise preferably chamfered and forms a wedge face 67. This angle is preferably smaller so that a truncated cone with an opening angle of preferably approximately 60° is formed. The two truncated cones are inclined in opposite directions to one another, i.e. the valve disk 65 tapers outwards in both directions.

As can be clearly seen by looking at FIGS. 13 and 4 together, the valve base 60 is received in the blind bore 217 of the second tappet rod head 211 or securely held therein. The valve cone 6 passes through the front end of the injector shaft 20 and the valve guide 7 and projects out of both with the valve disk 65.

Figure 15:
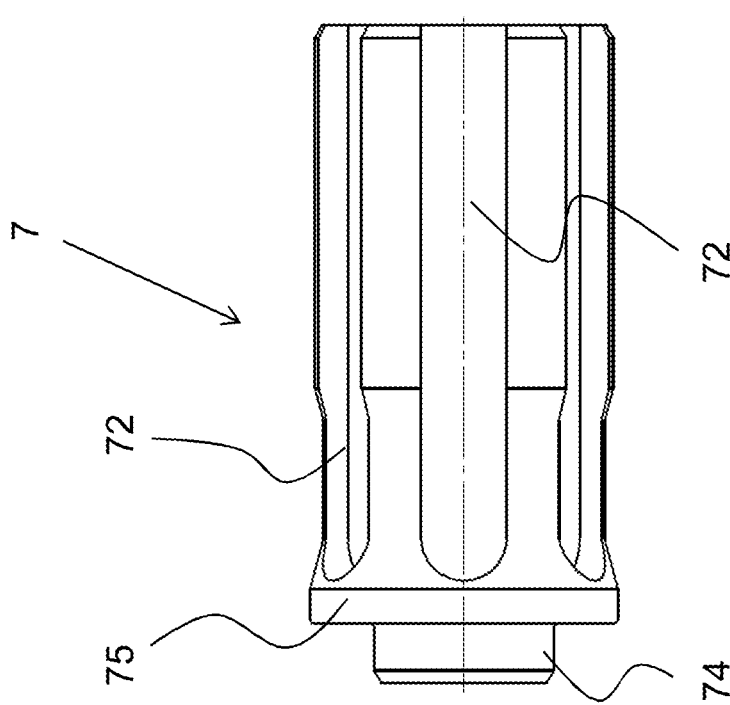
FIG. 15 a side view of the valve guide according to FIG. 14.
Figure 14:
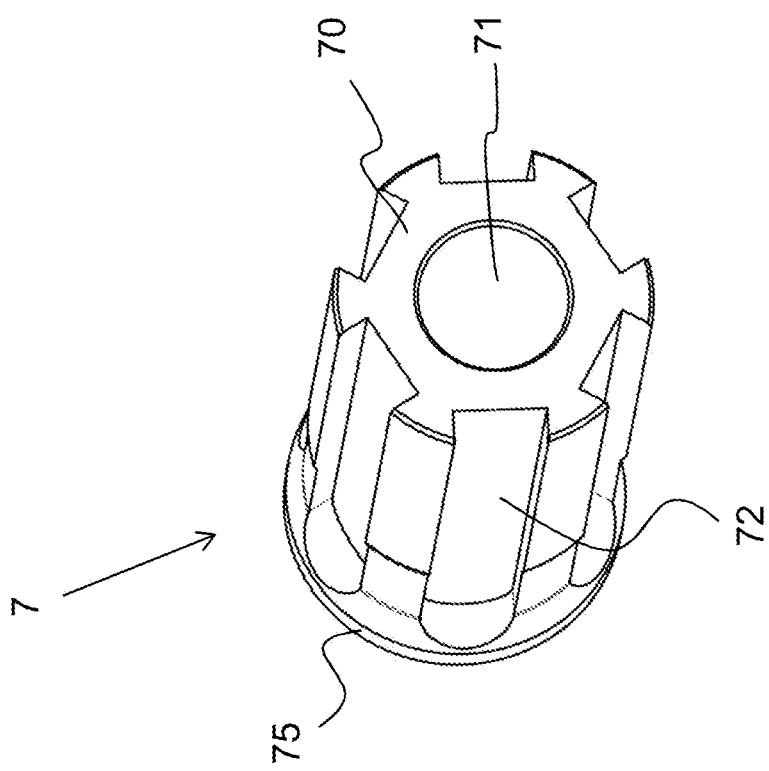
FIG. 14 a perspective illustration of a valve guide of the gas injector according to FIG. 4.

The valve guide 7 is illustrated in FIGS. 14 and 15. It has a hollow-cylindrical base body 70, whereof the lateral surface is provided with longitudinal grooves 72. The longitudinal grooves 72 form connecting channels for the gas.

A through-opening of the valve guide 7 is denoted by the reference sign 71. It serves as a valve-shaft guide. The base body 70 is adjoined by a circumferential flange 75, which merges into a hollow-cylindrical base. This forms a spring guide 74. The spring guide 74 has a smaller outer diameter than the base body 70 and serves as a centering means for the closing spring 23.

As can be clearly seen by looking at FIGS. 15 and 4 together, the spring guide 74 of the valve guide 7 projects into the cavity of the closing spring 23. The base body 70 is held in a fixed position in the valve body 8 via the axial force of the closing spring 23.

Figure 17:
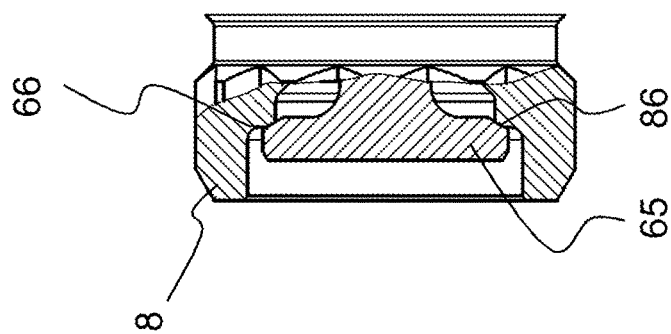
FIG. 17 an enlarged illustration of an end region according to A of FIG. 16.
Figure 16:
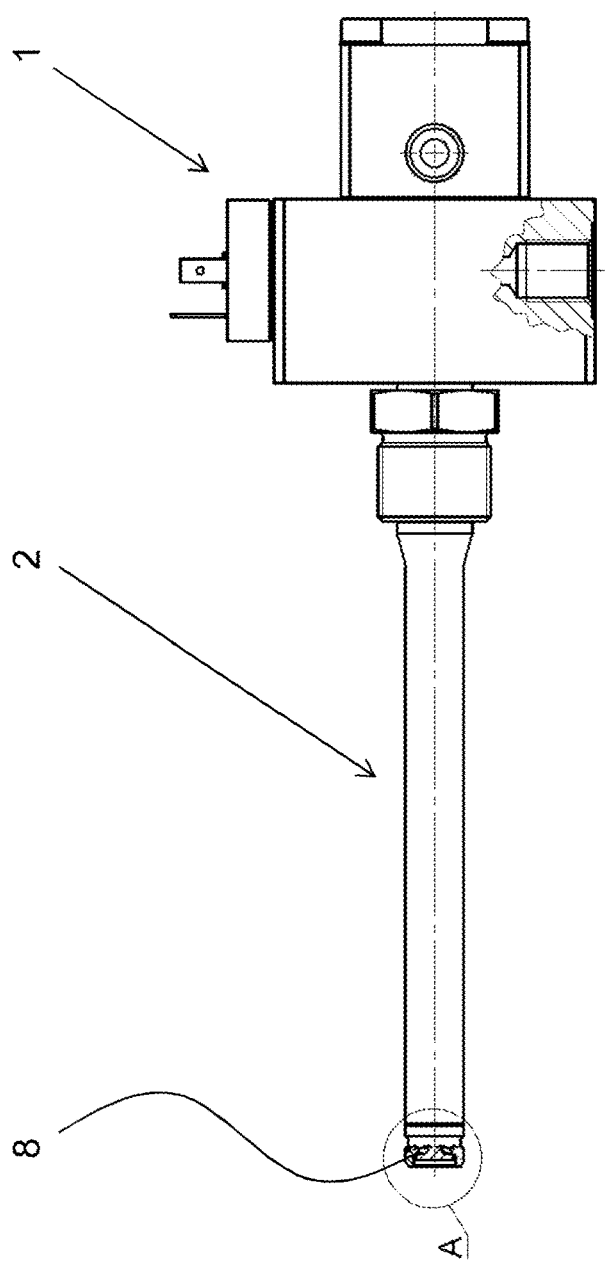
FIG. 16 a side view with a partial section through the gas injector according to FIG. 4.

The valve body 8 is described below with reference to FIGS. 16 to 19. It forms the front free end of the gas injector according to the invention, as can be clearly seen in FIG. 16. FIG. 17 is an enlarged illustration of the detail A according to FIG. 16. The valve body 8 is only partly illustrated here, wherein it can be clearly seen that the valve disk 65 is positioned with its frustoconical sealing face 66 against a suitably formed first stop of the valve body 8. This first stop forms the valve seat 86 of the gas valve according to the invention.

As can be seen in FIGS. 18 and 19, the valve body 8 substantially has a basic form with a plurality of hollow cylindrical portions. A first portion 80 forms the front free end of the gas injector. The first portion 80 is provided with a bi-hexagon 88 to enable it to be reliably assembled in the injector shaft. Instead of the bi-hexagonal serration, other form- or force-fitting screw-in options can be used.

The first portion 80 merges into a second portion 81 via a first taper 83. A second taper 84 then leads into a third portion 82 with a smaller outer diameter and an external thread. The second taper 84 is realized in a radially extending step, so that an outer stop 840 aligned perpendicularly to the longitudinal axis is formed, which serves as a sealing face with respect to the injector shaft.

A through-opening 85 extends through the entire valve body 8. In the region of the first portion 80, the diameter is widened towards the front free end of the gas injector, wherein the through-opening 85 has a constant diameter in this region until it leads to a perpendicularly extending, i.e. radially extending, ledge or balcony which serves as a stop. This stop forms the valve seat 86.

The through-opening 85 then extends in the direction contrary to the discharge direction of the gas in a plurality of steps, wherein the inner diameter of the valve body tapers and widens. A further radially extending step, which forms a second stop 87, is present in the region of the first taper 83.

As can be clearly seen by looking at FIGS. 19 and 4 together, the free end of the injector shaft 20 is positioned against the outer step 840 of the valve body 8 and the third portion 82 projects into the injector shaft 20. In this case, the external thread of the third portion 82 engages in the internal thread of the injector shaft 20.

The valve guide 7 is positioned against the second stop 87 and the valve disk 65 projects into the front chamber of the valve body 8.

Figure 20:
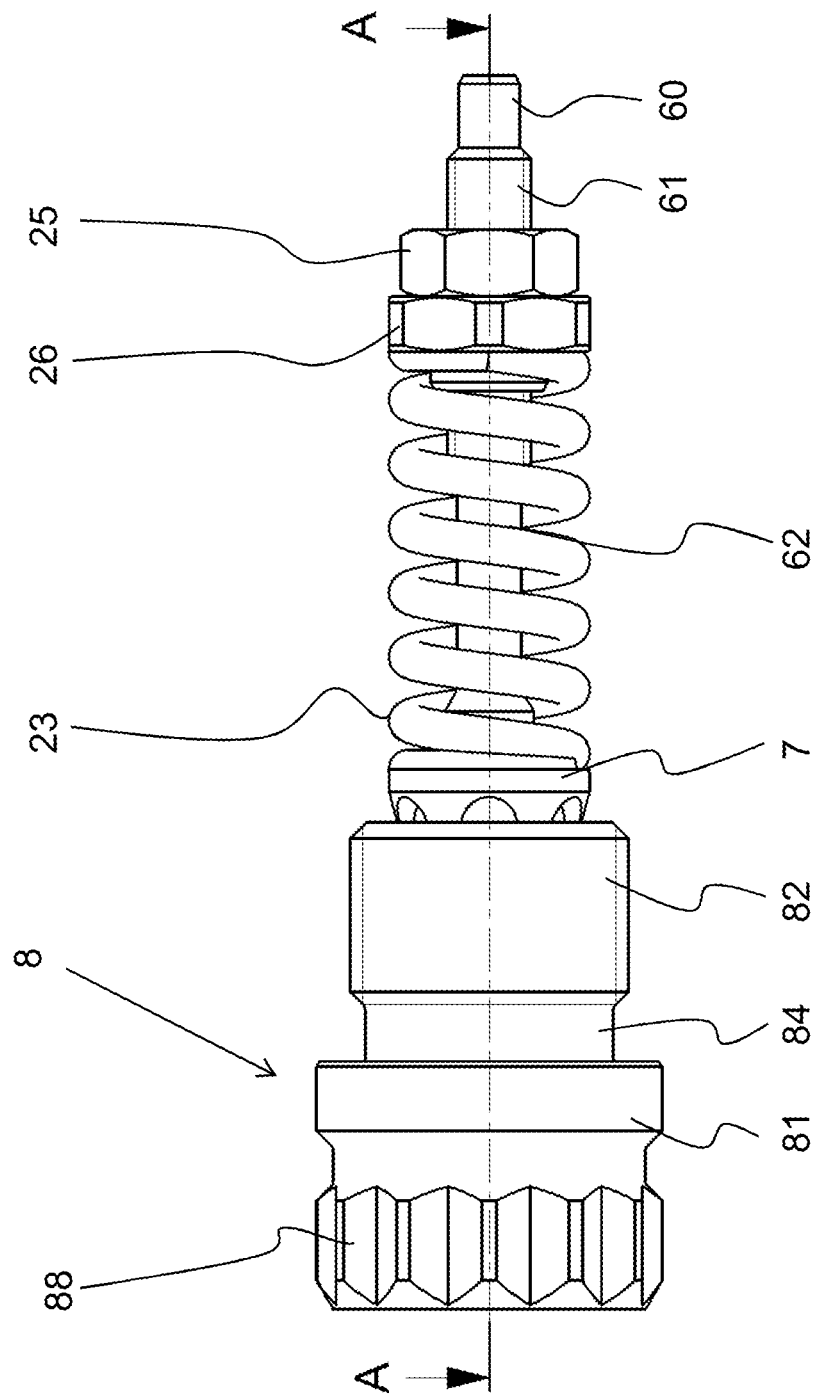
FIG. 20 an assembly of the gas injector according to FIG. 4 with valve body, valve guide, valve cone and closing spring and FIG. 21 a longitudinal section through the assembly according to FIG. 20.

The assembly comprising valve body 8, valve guide 7, valve cone 6 and closing spring 23 is illustrated in FIGS. 19 and 20. It can be clearly seen how the valve disk 65 is positioned against the valve seat 86 of the valve body 6 and therefore acts in a sealing manner.

Figure 21:
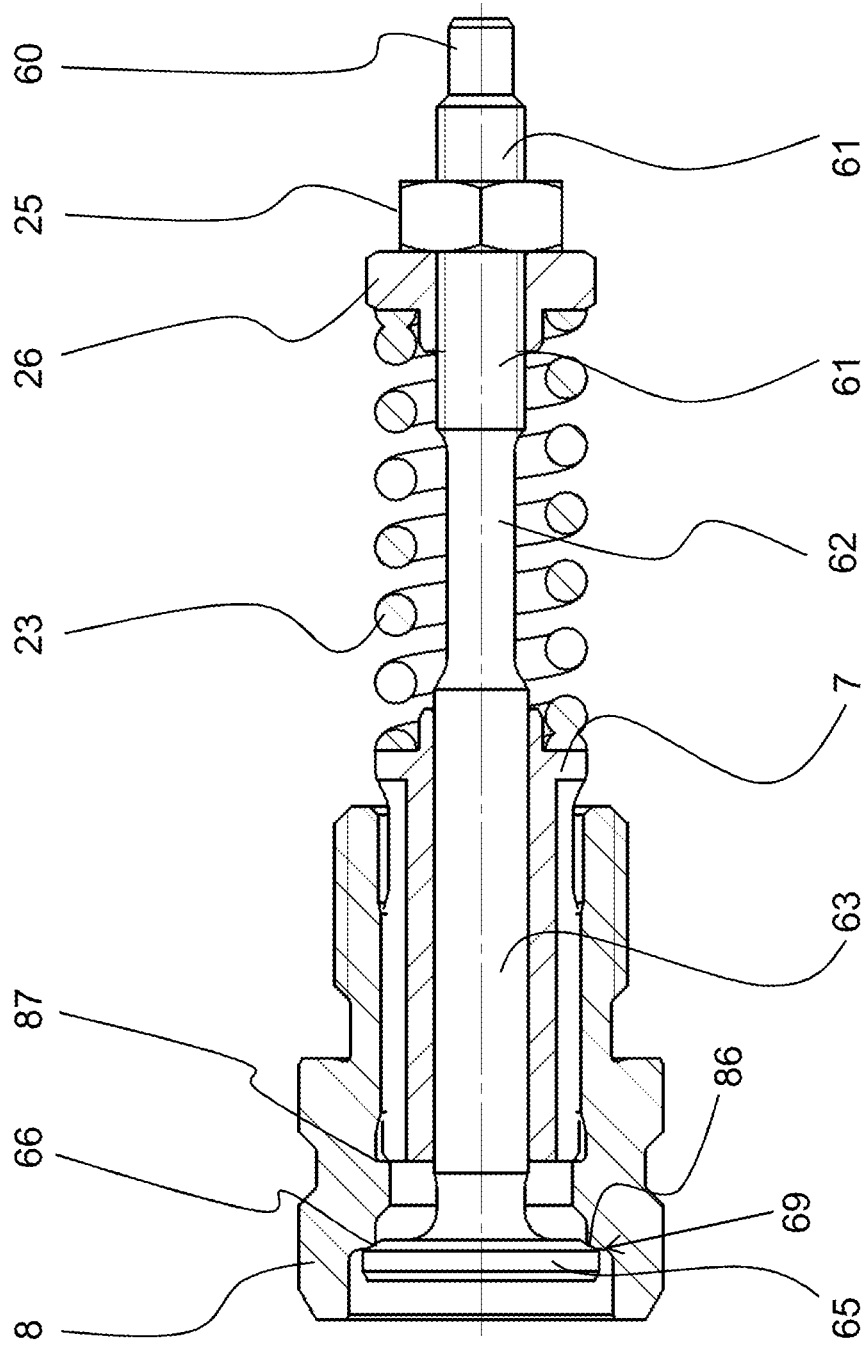

As the valve opens, a valve through-opening, denoted by the reference sign 69 in FIG. 21, is therefore produced between the valve disk 66 and the valve seat 86. It should be noted that, in this FIG. 21, the valve is illustrated in the closed position so that the site of the opening 69 can be seen although the opening 69 itself is not visible.

The gas injector according to the invention is preferably manufactured from materials which are not susceptible to corrosion. This prevents gas leaks caused by corrosion or valve wear. The valve disk, in particular, is preferably manufactured from an appropriate material, wherein nickel-based alloys, for example, have proven advantageous. The shaft 20 and the tappet rod 21 are preferably manufactured from materials with the same or similar coefficients of linear expansion, so that temperature-induced expansions can be compensated. Depending on the field of application, it is advantageous if the components of the gas injector are cast without copper or at least in a gas-tight manner. This is advantageous in particular when using the gas injector with biogas or other gases containing ammonia compounds.

The armature spindle 54 and the valve cone 6 preferably operate without lubrication. This can be achieved for example in that they undergo plasma surface treatment during production.

The mode of operation of the gas injector is explained below with the aid of FIGS. 4, 5 and 21, viewed together.

In the rest state or in the starting position, the closing spring 23, which is designed as a pressure spring, presses the valve disk 65 in the direction of the first shoulder, i.e. in the direction of the valve seat 86 of the valve body 8, and therefore holds the valve in the closed position. The armature plate 55 is located at a distance from the magnetic core 51.

If an electrical current is fed to the solenoid unit, more precisely the electromagnet, the armature plate 55 is attracted to the magnetic core 51, whereby the armature spindle 54 is moved in the longitudinal direction. The armature spindle 54 moves relative to the guide and buffer sleeve 53 towards the free end of the gas injector.

Owing to the connection of the armature spindle 54, injector shaft 21 and valve cone 6, the valve disk 65 is moved outwards in the discharge direction, away from the valve seat 86, i.e. the first stop. The valve opens and the valve through-opening 69, formed by the space between the valve seat 86 and the sealing face 66, is cleared.

Gas, which has flowed from the gas connection 11 via the gas chamber 18 along the intervening space formed by the outer curved surface of the tappet rod 21 and the inner surface of the injector shaft 20 in the direction of the valve cone 6 and has reached the valve disk 65 via the longitudinal grooves 72 of the valve guide 7, can reach the outside through the now-opened valve via the conical sealing face 66 and the valve seat 86 and therefore be injected into a combustion chamber or a prechamber.

The hollow design of the tappet rod 21 and its pressure-equalizing channels 212 and 213 in the tappet rod heads serve to enable the relatively long tappet rod 21 to move in an unchecked manner as stipulated by the solenoid. These cavities are conventionally also filled with the admitted gas.

The closing of the valve is realized by the closing spring 23. It pushes the valve cone 6 back until the valve disk 65 lies against the valve seat 86 again In a preferred embodiment, the tappet rod 21 and the armature spindle 54 with the armature plate 55 are uncoupled from the valve cone 6 during the closing procedure. Nevertheless, the individual parts are still guided radially in relation to one another. The impact energy in the valve seat is thus reduced and the useful life of the injector increased.

Owing to the accelerated inertial energy, the tappet rod 21, armature spindle 54 and armature plate 55 are moved in the direction of the upper stop 19. The excess kinetic energy is therefore transferred to the stop 19. The stop 19 acts as a force-consuming damping element, wherein the armature plate 55 can strike against this stop 19.

The pressure spring 50 pushes the armature plate 55 and therefore the armature spindle 54 and the tappet rod 21 back into their starting and rest positions. The moving parts of the gas injector, in particular the armature spindle 54, the tappet rod 21 and the valve cone 6, therefore again lie axially against one another without play. The valve cone 6 therefore specifies the reference position for these parts and the gas injector is again prepared for the next switching procedure.

The gas injector according to the invention can be designed to be relatively small and slim. It minimizes switching delays, eliminates dead spaces and prevents contamination of the valve.

The invention claimed is:

1. A gas injector having an injector lance, a drive unit, a tappet rod and a valve, wherein the injector lance has a free end for injecting gas into an external unit, wherein the drive unit generates a linear movement of the tappet rod, whereby the tappet rod actuates the valve and releases a valve passage opening in order to inject the gas, wherein the valve passage opening is arranged in a region of the free end of the injector lance,
wherein the injector lance has a shaft and the tappet rod is arranged within the shaft and is linearly displaceable relative thereto,
wherein the free end of the injector lance is formed by a valve body, wherein the valve body is arranged at a free end of the shaft,
wherein the valve body has a through-opening, which extends through the entire valve body and
wherein the valve body comprises a first portion which forms a front free end of the gas injector, wherein the first portion merges into a second portion via a first taper,
wherein, in the region of the first portion to the front end of the gas injector, the diameter of the through-opening is widened,
and wherein the through-opening comprises in this region a constant diameter, until it leads in direction opposite to the outflow direction of the gas to a radially extending ledge or balcony, which serves as a stop and which forms the valve seat.

2. The gas injector as claimed in claim 1, wherein the valve is a sole valve of the gas injector.

3. The gas injector as claimed in claim 1, wherein the drive unit comprises a solenoid unit, wherein the tappet rod is connected to an armature plate of the solenoid unit, and wherein the armature plate is movable by actuating an electromagnet of the solenoid unit.

4. The gas injector as claimed in claim 3, wherein an armature spindle is present which connects the tappet rod to the armature plate, wherein the armature spindle passes through the electromagnet.

5. The gas injector as claimed in claim 4, wherein the armature spindle is solid.

6. The gas injector as claimed in claim 1, wherein the valve has a valve cone having a valve rod and a valve disk arranged thereon, and wherein the valve rod is connected to the tappet rod and is linearly displaceable together therewith.

7. The gas injector as claimed in claim 6, wherein the valve rod is solid.

8. The gas injector as claimed in claim 6, wherein the valve disk has a sealing face directed contrary to a discharge direction of the gas, which lies in a sealing manner against the valve seat in order to thereby close the valve passage opening and therefore the valve.

9. The gas injector as claimed in claim 8, wherein the valve cone is displaceable in the discharge direction in order to open the valve.

10. The gas injector as claimed in claim 6, wherein a closing spring is present between the tappet rod and the valve cone, which closing spring holds the valve in the closed position and/or closes it.

11. The gas injector as claimed in claim 10, wherein the drive unit comprises a solenoid unit and wherein the tappet rod is connected to an armature plate of the solenoid unit, wherein the armature plate is movable by actuating and electromagnet of the solenoid unit and wherein a second spring is present, which, after a closing procedure of the valve, brings at least the tappet rod back into a starting position, wherein the second spring has a spring force which is lower than the spring force of the closing spring.

12. The gas injector as claimed in claim 11, wherein the second spring brings all moving parts of the drive unit back into the starting position.

13. The gas injector as claimed in claim 6, wherein the valve cone is uncoupled from the tappet rod as the valve closes.

14. The gas injector as claimed in claim 6, wherein the valve-through opening is produced between the valve disk and the valve seat when the valve opens.

15. The gas injector as claimed in claim 1, wherein the tappet rod is hollow.

* * * * *